US009346984B2

(12) United States Patent
Lutz

(10) Patent No.: US 9,346,984 B2
(45) Date of Patent: May 24, 2016

(54) WASH-OFF RESISTANT EPOXY ADHESIVE COMPOSITION AND PRE-GELLED ADHESIVE

(71) Applicant: Andreas Lutz, Galgenen (CH)

(72) Inventor: Andreas Lutz, Galgenen (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/379,563

(22) PCT Filed: Jan. 17, 2013

(86) PCT No.: PCT/US2013/021861
§ 371 (c)(1),
(2) Date: Aug. 19, 2014

(87) PCT Pub. No.: WO2013/141955
PCT Pub. Date: Sep. 26, 2013

(65) Prior Publication Data
US 2015/0037497 A1     Feb. 5, 2015

Related U.S. Application Data

(60) Provisional application No. 61/613,508, filed on Mar. 21, 2012.

(51) Int. Cl.
*B05D 3/02* (2006.01)
*C09J 163/00* (2006.01)
*C09J 163/02* (2006.01)
*C08G 59/62* (2006.01)
*B05D 3/00* (2006.01)
*C09J 7/02* (2006.01)

(52) U.S. Cl.
CPC .............. *C09J 163/00* (2013.01); *B05D 3/007* (2013.01); *B05D 3/02* (2013.01); *C08G 59/621* (2013.01); *C09J 7/0203* (2013.01); *C09J 2463/00* (2013.01)

(58) Field of Classification Search
None
See application file for complete search history.

(56) References Cited

U.S. PATENT DOCUMENTS

| | | | |
|---|---|---|---|
| 4,507,412 | A | 3/1985 | Hickner et al. |
| 4,713,432 | A | 12/1987 | Bagga et al. |
| 5,278,257 | A | 1/1994 | Mulhaupt et al. |
| 5,567,748 | A | 10/1996 | Klein et al. |
| 7,615,595 | B2 | 11/2009 | Lutz et al. |
| 7,625,977 | B2 | 12/2009 | Lutz et al. |
| 7,642,316 | B2 | 1/2010 | Rego et al. |
| 8,026,468 | B2 | 9/2011 | Lee et al. |
| 8,114,519 | B2 | 2/2012 | Kramer et al. |
| 2003/0187154 | A1 | 10/2003 | Schoenfeld et al. |
| 2006/0276601 | A1 | 12/2006 | Lutz et al. |
| 2007/0027233 | A1 | 2/2007 | Yamaguchi et al. |
| 2008/0319105 | A1 | 12/2008 | Lutz et al. |
| 2009/0048370 | A1 | 2/2009 | Lutz et al. |
| 2010/0310878 | A1 | 12/2010 | Hofstetter et al. |
| 2013/0310878 | A1 | 11/2013 | McCormack et al. |

FOREIGN PATENT DOCUMENTS

| | | |
|---|---|---|
| EP | 1996641 A1 | 12/2008 |
| JP | 2006199851 A | 8/2006 |
| WO | 2005007766 A1 | 1/2005 |
| WO | 2005118734 A1 | 12/2005 |
| WO | 2010019539 A2 | 2/2010 |
| WO | 2010098950 A1 | 9/2010 |
| WO | 2012006001 A2 | 1/2012 |

*Primary Examiner* — Robert Sellers
(74) *Attorney, Agent, or Firm* — Hong J. Xu

(57) ABSTRACT

An epoxy adhesive composition is provided that has superior wash-off resistance after pre-gelling, and may be used, e.g., in manufacturing processes, e.g., in the automobile industry. The compositions comprise an epoxy resin, a gelling agent, and a phenolic agent, and may optionally comprise other components. Methods of making and using the compositions are also provided.

9 Claims, No Drawings

WASH-OFF RESISTANT EPOXY ADHESIVE COMPOSITION AND PRE-GELLED ADHESIVE

FIELD OF THE INVENTION

The present invention relates to epoxy adhesive systems, including, e.g., epoxy adhesives that have good wash-off resistance when partially cured. The invention also relates to industrial assembly systems and methods of assembly using such epoxy adhesive systems.

INTRODUCTION

Some manufacturers. e.g., automobile manufacturers, use pre-gel ovens to pre-gel epoxy adhesive applications of partially assembled products, e.g., auto body parts, prior to the partially assembled parts passing through subsequent processing, such as washing, phosphate and e-coat baths. Such pre-gel ovens typically run at temperatures of about 120° C. Partially assembled parts, e.g., car bodies, typically pass through the pre-gel oven in about 5 to 15 minutes. In this time and at this temperature a crash durable adhesive (CDA) must be pre-gelled or pre-cured to such an extent, that the viscosity and viscous yield stress will have increased to a level that prevents the adhesive from becoming washed-out in the subsequent processing, e.g, the subsequent baths. Such subsequent processing generally occurs at elevated temperatures, e.g., temperatures in excess of 60° C. It is, therefore, desired that a pre-gelled epoxy adhesive be sufficiently set that it does not wash off at these temperatures under typical processing conditions.

Additives used to obtain these characteristics typically include thermoplastic compounds, such as polyester-diols, polyamides or polyvinylbutyral (PVB). WO 2005/118734 and U.S. Pat. No. 7,615,595B2 describes the use of polyester-diols for wash-off resistant formulations, but not for gelling.

U.S. Patent Publication 2010/0310878 is directed to heat-curing epoxy resins with improved wash-out resistance. The disclosed compositions comprise an epoxy resin, a heat-curing agent activated by elevated temperature, and a fatty acid amide or polyamide having a melting point between 100 and 145° C.

None of these compounds offers an acceptable wash-out resistance at temperatures above 60° C., without the presence of a co-agent beside the curing agent DICY and common accelerators like substituted ureas or 2,4,6-tris(dimethylaminomethyl)phenol integrated into a poly(p-vinylphenol) matrix. However, even with these gelling agents, there can be insufficient pre-gelling or pre-curing.

SUMMARY OF THE INVENTION

It has been surprisingly found that inclusion of a phenolic compound in an epoxy adhesive composition comprising a thermoplastic gelling agent improves the curing properties of the composition, e.g., provides a pre-gelled epoxy adhesive with improved wash-out resistance. Without being limited to any particular theory, it is believed that the phenolic agent promotes chemical reaction between the epoxy resin and the functional groups of the gelling agent at pre-gelling temperatures, e.g., at about 120° C.

The present invention provides an epoxy adhesive composition comprising an epoxy resin, a phenolic agent, a gelling agent, and a hardener, the phenolic agent being present in an amount of 0.5-8 wt % of the composition.

The present invention also provides a method comprising applying to a surface (e.g., a metal surface) an uncured epoxy adhesive composition comprising an epoxy resin, a phenolic agent, a gelling agent, and a hardener, the phenolic agent being present in an amount of 0.5-8 wt % of the composition; and heating the applied epoxy adhesive for a period of 3 to 20 minutes at a temperature of 80 to 150° C. to obtain a pre-gelled epoxy adhesive.

In certain preferred embodiments of the inventive compositions and methods, the pre-gelled epoxy adhesive (applied, e.g., to a metal surface) has less than 20% wash-off when sprayed with a water jet having pressure of 2 bar, the water at a temperature of 60° C., the water jet applied for 40 seconds, at an angle of 60°, from a distance of 30 cm from the surface.

In certain preferred embodiments of the inventive compositions and methods, the pre-gelled epoxy has a viscosity between 2 and 20 times the viscosity of the uncured epoxy adhesive when viscosity is measured at 45° C. at a shear rate of 1 $s^{-1}$ and/or 10 $s^{-1}$.

DETAILED DESCRIPTION OF THE INVENTION

We have found that including a phenolic agent and a gelling agent in an epoxy adhesive composition improves gelling behavior and provides improved wash-out resistance. The phenolic agent can comprise any poly-phenolic or phenolic compound. The phenolic agent can be solid or liquid at room temperature, and is preferably liquid for easier measurement. Some suitable poly-phenolic compounds include trisphenols, bisphenols, and their derivatives, and combinations of one or more thereof.

By "derivative" of a phenolic agent is meant optional substitution of hydrogen atoms of the phenolic agent. The substitution can be on any portion of the phenolic agent, including, e.g., on phenolic or non-phenolic aromatic ring(s), or on a non-aromatic portion of the compound. The substituent can be a hydrocarbyl group (e.g., alkyl, alkenyl, or alkynyl groups), a hydroxy, or a halide. A hydrocarbyl substituent preferably has 1-6 carbons, more preferably 2-5 carbons, most preferably 3 carbons, and may be straight-chain, branched, or cyclic. The substituent may optionally comprise one or more heteroatoms, e.g., may comprise a hydroxy, ester, aldehyde, carboxylic acid, carbonyl, ether, thiol, amide, or halide group. Preferred derivatives include alkenyl groups, such as allyl and vinyl groups. Preferred sites of substitution are on the phenolic ring, and may be in any available position, ortho-, meta-, and/or para-, preferably ortho-.

Some preferred phenolic agents include phenols, bisphenols, their derivatives, and combinations thereof. U.S. Pat. No. 8,026,468 discloses phenolic compounds suitable as phenolic agents in the present invention. Some preferred bisphenols include bisphenol A, AP, AF, B, BP, C, E, F, G, K, M, S, P. PH, TMC and Z, as well as derivatives and combinations thereof. Some more preferred phenolic agents include bisphenol A, bisphenol B, and derivatives thereof. Some yet more preferred phenolic agents include o,o'-diallylbisphenol A (ODBA), resorcinol, and o-allylphenol. Suitable phenolic agents are available commercially, and may also be prepared by one of ordinary skill in the art. Natural products rich in phenols (e.g., cashew nut shell oil, which is rich in resorcinol), can be used as a source of the phenolic agent.

Preferred phenolic agents have molecular weight less than 500 g/mol or 400 g/mol. Preferred phenolic agents have molecular weight greater than or equal to 94 g/mol, 110 g/mol, or 150 g/mol.

Any amount of phenolic agent may be used to obtain the desired properties, and the person of ordinary skill in the art will be able to determine a suitable amount for any particular application. The phenolic agent will generally comprise more than or equal to 0.5 wt %, 1 wt %, 2 wt % or 3 wt % of the epoxy adhesive composition. The phenolic agent will generally comprise less than or equal to 8 wt %, 6 wt % or 5 wt % of the epoxy adhesive composition. Some preferred amounts include 2 wt % and 5 wt %.

Any gelling agent can be used that, in combination with the phenolic agent provides suitable gelling properties. The preferred gelling agent should comprise functional groups that are capable of reacting with an epoxy resin. Preferred gelling agents include thermoplastic compounds such as polyesterdiols, polyamides, fatty acid amides, or polyvinyl butyral.

Examples of suitable gelling agents include polyesters of the Dynacoll® 7,000 series (Degussa), e.g., Dynacoll® 7330 and Dynacoll® 7381 polyesters. Castor oil wax with polyamides may also be used, and are commercially available from Rockwood under the trade name Rheotix, e.g., Rheotix 240 Other suitable gelling agents include Luvotix grades (like Luvotix HT) supplied from Lehmann, and Voss which is a polyamide without the wax or Disparlon grades supplied from Kusumoto Chemicals Ltd. Suitable polyvinyl butyrals include Mowital B 60H and Mowital B 60HH from Kuraray. Fatty acid amides and polyamides disclosed in U.S. Patent Publication 2010/0310878 are also suitable.

As the gelling agent is a polymer, it will generally have a high molecular weight. The molecular weight of the gelling agent will generally be at least 1,000 g/mol, 2,000 g/mol or 3,000 g/mol. The gelling agent will generally have a molecular weight less than 5,000 g/mol or 4,000 g/mol.

Any amount of gelling agent may be used to obtain the desired properties, and the person of ordinary skill in the art will be able to determine a suitable amount for any particular application. Gelling agent will generally comprise at least 1 wt %, 2 wt % or 3 wt % of the epoxy adhesive composition. Gelling agent will generally comprise less than or equal to 10 wt %, 6 wt % or 5 wt % of the epoxy adhesive composition. For example, some preferred ranges include 1-10 wt %, and 2-5 wt % of the epoxy adhesive composition.

Epoxy resins useful in this invention include a wide variety of curable epoxy compounds and combinations thereof. Useful epoxy resins include liquids, solids, and mixtures thereof. Typically, the epoxy compounds are epoxy resins which are also referred to as polyepoxides. Polyepoxides useful herein can be monomeric (e.g., the diglycidyl ether of bisphenol A, diglycidyl ether of bisphenol F, digylcidyl ether of tetrabromobisphenol A, novolac-based epoxy resins, and tris-epoxy resins), higher molecular weight resins (e.g., the diglycidyl ether of bisphenol A advanced with bisphenol A) or polymerized unsaturated monoepoxides (e.g., glycidyl acrylates, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule. Solid epoxy resins that may be used in the present invention can preferably comprise or preferably be mainly based upon Bisphenol A. For example, a preferred epoxy resin is diglycidyl ether of bisphenol A Dow Chemical DER 664 UE solid epoxy. Some other preferred epoxy resins include, for example, D.E.R. 331, D.E.R. 332, D.E.R. 383, D.E.R. 431 and D.E.R.736, all commercially available from The Dow Chemical Company.

One preferable epoxy resin has general formula:

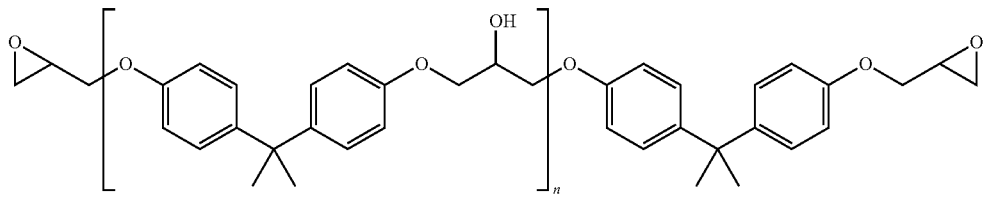

where n is generally in the range of 0 to about 25. Basic liquid resins, e.g. D.E.R. 331, have epoxy equivalent weights in the range of about 180-195 g/mol.

Combinations of epoxy resins may be used to adjust properties of the epoxy adhesive. In compositions and methods of the present invention, the epoxy adhesive may comprise any amount of epoxy resin. Preferably, the liquid and/or solid epoxy resin comprises more than or about 20 wt %, more preferably more than or about 25 wt % or 30 wt %, of the epoxy adhesive. Preferably, the liquid and/or solid epoxy resin comprises less than or about 60 wt %, more preferably less than or about 55 wt % or 50 wt %, of the epoxy adhesive.

A toughener is optionally used in the compositions and methods of the present invention. Any tougheners may be used, including, e.g., capped polyurethanes (equivalent to blocked PU) and rubber epoxy resins, as well as combinations thereof. Some preferred capped polyurethane tougheners include those described in U.S. Pat. No. 8,062,468B2, U.S. Pat. No. 5,278,257, EP2084200, EP 0308664 A1, or US 2006/0276601 A1. When used, tougheners, e.g., capped-PU tougheners, may be present in amounts more than or about 6 wt %, preferably more than or about 10 wt % of the epoxy adhesive. When used, tougheners may be present in amounts less than or about 20 wt %, more preferably less than or about 18 wt % of the epoxy adhesive.

Rubber components, including liquid rubber or core-shell rubber may be optionally used in the present invention. Some preferred liquid rubber and core-shell rubber compositions are disclosed in U.S. Pat. Nos. 7,642,316 and 7,625,977.

A rubber-modified epoxy resin is an epoxy-terminated adduct of an epoxy resin and at least one liquid rubber that has epoxide-reactive groups, such as amino or preferably carboxyl groups. The rubber in this case is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized unsaturated nitrile monomer.

The rubber preferably contains (prior to reaction with the epoxy resin to form the adduct) from about 1.5, more preferably from about 1.8, to about 2.5, more preferably to about 2.2, epoxide-reactive terminal groups per molecule, on average. Carboxyl-terminated rubbers are preferred. The molecular weight ($M_n$) of the rubber is suitably from about 2000 to about 6000, more preferably from about 3000 to about 5000.

Suitable carboxyl-functional butadiene and butadiene/acrylonitrile rubber starting materials are commercially available from Noveon under the tradenames Hycar® 2000X162 carboxyl-terminated butadiene homopolymer and Hycar® 1300X31 Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

Some preferred rubber modified epoxy resins are sold under the trade name Struktol®, e.g., Struktol® 3604. When used, rubber modified epoxy resins may be present in amounts more than or about 5 wt %, more preferably more than or about 8 wt %, more preferably more than or about 10 wt % of the epoxy adhesive. When used, rubber modified epoxy resins may be present in amounts less than or about 25 wt %, more preferably less than or about 20 wt % of the epoxy adhesive.

The rubber is formed into an epoxy-terminated adduct by reaction with an excess of an epoxy resin. Enough of the epoxy resin is provided to react with all of the epoxide-reactive groups on the rubber and to provide free epoxide groups on the resulting adduct, without significantly advancing the adduct to form high molecular weight species. A ratio of at least two equivalents of epoxy resin per equivalent of epoxy-reactive groups on the rubber is preferred. More preferably, enough of the epoxy resin compound is used that the resulting product is a mixture of the adduct and some free epoxy resin compound. Typically, the rubber and an excess of the epoxy resin are mixed together with a polymerization catalyst and heated to a temperature of about 100 to about 250° C. in order to form the adduct. Useful catalysts for conducting the reaction between the rubber and the epoxy resin include those described below. Preferred catalysts for forming the rubber-modified epoxy resin include phenyl dimethyl urea and triphenyl phosphine.

A wide variety of epoxy resins can be used to make the rubber-modified epoxy resin, including any of those described before. Preferred epoxy resins are liquid or solid glycidyl ethers of a bisphenol such as bisphenol A or bisphenol F. Halogenated, particularly brominated, resins can be used to impart flame retardant properties if desired. Liquid epoxy resins (such as DER 330 and DER 331 resins, which are diglycidyl ethers of bisphenol A available from The Dow Chemical Company) are especially preferred for ease of handling.

When a rubber-modified epoxy resin is present, as just described, the rubber-modified epoxy resin will serve as all or part of each of components (A) (the epoxy resin) and (B) (the toughening rubber) of the structural adhesive of the invention. Thus, if a rubber-modified epoxy resin is present, it is not necessary for the structural adhesive to include any additional toughening rubber or any additional epoxy resin. However, one or more such additional epoxy resins may also be present, and one or more additional toughening rubbers, notably a core-shell rubber as described below, may also be present together with a rubber-modified epoxy resin.

The core-shell rubber component may be a particulate material having a rubbery core. Any core-shell rubber material may be used in the present invention.

The rubbery core preferably has a Tg of less than −25° C., more preferably less than −50° C., and even more preferably less than −70° C. The Tg of the rubbery core may be well below −100° C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material is preferably grafted onto the core or is crosslinked. The rubbery core may constitute from 50 to 95%, especially from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally crosslinked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl.

The shell polymer, which is optionally chemically grafted or crosslinked to the rubber core, is preferably polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer is generally between 20,000 and 500,000.

A preferred type of core-shell rubber has reactive groups in the shell polymer which can react with an epoxy resin or an epoxy resin hardener. Glycidyl groups are suitable. These can be provided by monomers such as glycidyl methacrylate.

A particularly preferred type of core-shell rubber is of the type described in U.S. 2007/0027233 (EP 1 632 533 A1). Core-shell rubber particles as described in the document include a crosslinked rubber core, in most cases being a crosslinked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Preferred core-shell rubbers (CSRs) include those sold by Kaneka Corporation under the designation Kaneka Kane Ace, including the Kaneka Kane Ace 15 and 120 series of products, including Kaneka Kane Ace MX 153, Kaneka Kane Ace MX 156 and Kaneka Kane Ace MX 120 core-shell rubber dispersions, and mixtures thereof. The products contain the core-shell rubber particles pre-dispersed in an epoxy resin, at concentrations of approximately 33% or 25%.

Any amount of core-shell rubber may be used. When present, the epoxy adhesive of the invention preferably has a total core-shell rubber content of at least 1 wt %, more preferably at least 3 wt %, more preferably at least 5 wt %, more preferably at least 8 wt %. The epoxy adhesive of the invention preferably has a total core-shell rubber content up to 15 wt %, more preferably up to 12 wt %. A preferred amount includes 10 wt %. When the CSR is provided, e.g., as a dispersion, the total CSR content is calculated for purposes of this invention based on the weight of the CSR in the composition.

Other flexibilizers, such as polyamine-epoxy adducts may also be used as a rubber component. Some suitable polyamine-epoxy adducts are disclosed in U.S. Pat. Nos. 5,567,748 and 4,507,412.

Any curing agent appropriate for a one-component (1K) or two-component (2K) epoxy adhesive may be used. As is known in the art, a 1K epoxy adhesive contains all of the ingredients for the adhesive in a single composition, and does not cure until exposed to the appropriate conditions (e.g., heat or radiation), which activates the latent hardener. In a 2K epoxy adhesive, curing can take place at ambient conditions, such that the adhesive comprises at least two different compositions, which are kept separate until use.

The curing agent, preferably for a 1K adhesive composition, preferably comprises a latent curing agent. Any latent curing agent that does not cause hardening under ambient conditions ("ambient conditions" meaning, e.g., typical room temperature and normal lighting conditions) may be used. A latent curing agent that causes the epoxy adhesive to be curable by application of heat is preferred. Some preferred hardeners include dicyandiamide, imidazoles, amines, amides, polyhydric phenols, and polyanhydrides. Dicyandiamide (also known as DICY, dicyanodiamide, and 1- or 2-cyanoguanidine) is preferred. DICY (CAS 461-58-5) has empirical formula $C_2N_4H_4$, molecular weight 84, and may be represented with structural formula:

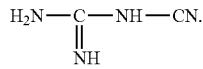

Any amount of curing agent may be used as appropriate for any particular composition according to the present invention, and may be determined by one of ordinary skill in the art. The amount of curing agent is preferably more than or equal to 1 wt %, more preferably more than or equal to 2 wt %, more preferably more than or equal to 3 wt % of the epoxy adhesive. The amount of curing agent is preferably less than or equal to 5 wt %, more preferably less than or equal to 4 wt % of the epoxy adhesive. Some preferred amounts include about 4.5, 4.4, and 4.2 wt %.

Use of a curing accelerator is optional, but preferred. When a latent curing agent is used, the curing accelerator is preferably present in sufficient amount to catalyze the curing reaction when exposed to conditions, e.g., temperatures, at which the latent curing agent catalyzes the curing process. When used, any suitable curing accelerator may be used, and may be selected by one having ordinary skill in the art. Some preferred curing accelerators include ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N,N'-dimethylurea (Chlortoluron), tert-acryl- or alkylene amines like benzyldimethylamine, 2,4,6-tris(dimethylaminomethyl)phenol, piperidine or derivates thereof, imidazole derivates, in general $C_1$-$C_{12}$ alkylene imidazole or N-arylimidazols, such as 2-ethyl-2-methylimidazol, or N-butylimidazol, 6-caprolactam, a preferred catalyst is 2,4,6-tris(dimethylaminomethyl)phenol integrated into a poly(p-vinylphenol) matrix (as described in U.S. Pat. No. 4,713,432 and EP 0 197 892). The curing accelerator may, for example, comprise a composition obtained from a combination of a high-boiling nitrogen base, and a phenolic polymer which is an addition polymer of a phenol bearing an unsaturated substituent. Particularly preferred curing accelerators include blocked tert-amines using polymeric phenols like PVP or Novolak. Another particularly preferred curing accelerator comprises 2,4,6-tris(dimethylaminomethyl)phenol integrated into a poly(p-vinylphenol) matrix. Accelerators like those disclosed in WO 2012006001 are also suitable.

Preferably, the curing accelerator is present in the adhesive composition in the amount of, or greater than, 0 wt %, 0.3 wt %, or 0.5 wt %. Preferably, the curing accelerator is present in an amount of, or less than, 2 wt %, 1.5 wt % or 1.3 wt %.

When used, fillers may be present in any useful amount, and can be determined by those of ordinary skill in the art using this document as guidance. Typically, fillers may be present in amounts more than or about 3 wt %, more preferably more than or about 5 wt % of the epoxy adhesive. Fillers may be present in amounts less than or about 20 wt %, more preferably less than or about 15 wt % of the epoxy adhesive.

Optional fillers include mineral fillers, such as calcium carbonate, calcium oxide, and talc. Calcium carbonate (e.g., sold under trade name Omya®), which can be used to reduce shrinkage and increase corrosion resistance. Calcium oxide (e.g., sold under the trade name Chaux Vive) is a humidity scavenger that may help to preserve a partially-cured epoxy adhesive prior to final curing. Talc is available, e.g., under the trade name Mistrofil®, and aluminum magnesium silicate (wollastonite) is available, e.g., under the trade name Nyad® 200.

Thixotropic agents and other viscosity regulators may also be optionally used. One such preferred example includes fumed silica (e.g., sold under the trade name Aerosil®). A preferred thixotropic agent that also improves wash-off resistance is a mixture of polyester and liquid epoxy resin (LER), such as Dynacol (25% polyester 7330 and 75% LER 330).

When used, fumed silica may be present in amounts more than or about 2 wt %, preferably more than or about 6 wt % of the epoxy adhesive. Fumed silica may be present in amounts less than or about 15 wt %, more preferably less than or about 12 wt % of the epoxy adhesive.

At least one adhesion promoter may also be optionally used. Preferred adhesion promotes include epoxy silanes, e.g., sold under the trade name Silquest™ A-187.

At least one surfactant or wetting agent may be optionally used. A preferred wetting agent is a non-ionic fluorinated polymer. Such agents are also preferably capable of absorbing residual oils (e.g., manufacturing and processing oils) on metal surfaces, thereby facilitating adhesion to metal surfaces.

The inventive compositions show good gelling characteristics in a pre-gelling product assembly procedure. That is, when exposed to pre-gelling conditions, the partially cured adhesive should remain substantially intact during subsequent processing steps, preferably at least until the curing process is substantially completed. It will be appreciated that suitable pre-gelling conditions should not result in compete setting of the composition, and suitable pre-gelling conditions can be determined by one of ordinary skill in the art.

When a heat activated latent curing agent is used, pre-gelling conditions include exposing the adhesive composition to a temperature, and for a time, sufficient to begin the curing process. Suitable pre-gelling temperatures and times can be determined by one of skill in the art for any particular application. In general, the pre-gelling temperature will be greater than or equal to 80, 90, or 100° C. In general, the pre-gelling temperature will be less than or equal to 150, 140, or 130° C. A preferred pre-gelling temperature is about 120° C. In general, the pre-gelling time will be greater than or equal to 3, 5, or 10 minutes. In general, the pre-gelling time will be less than or equal to 20, 15, or 12 minutes.

The inventive composition, when pre-gelled, is preferably resistant to removal, wash-off or breakage in subsequent processing steps. Without limiting the invention, possible subsequent processing steps include any or all of the following: washing, phosphate coating, painting, and/or e-coat baths.

Various tests may also be employed to determine pre-gelling properties of the inventive composition. For example, in a wash-off test, a bead of the inventive composition may be pre-gelled, and then tested for wash-off by applying a pressurized water jet. Depending on the application, a fluid other than water may be used, e.g., an aqueous solution, a mixture of water and organic solvent (with or without solutes), an organic solvent, air, etc. The parameters used in the test will preferably be relevant to the particular assembly application, and can be determined by one of ordinary skill in the art. Preferably, the pre-gelled composition will exhibit no more than slight wash-off, more preferably, the pre-gelled composition will exhibit no wash-off. Preferably, less than 30% of the pre-gelled epoxy will wash off, more preferably less than 20%, more preferably less than 10%, or less than 5%. Most preferably, none of the adhesive will wash off (0% wash-off).

Any water pressure relevant to the particular application may be used. In some preferred applications, the water pressure can be set to 1-3 bar (gauge), preferably about 1.6 or 2 bar (gauge).

Any water temperature relevant to the particular application may be used. In some preferred applications, the water temperature can be in the range of about 50°-80° C., preferably about 58° or 60° C.

Any angle of the water jet may be used. In some preferred applications, the angle can be set to about 45°-70°, preferably about 60°, relative to the perpendicular.

The fluid jet may be applied for any length of time relevant to the particular application. In some preferred applications, the jet is applied for about 10-60 seconds, preferably for about 20-40 seconds, e.g., about 30 or 40 seconds.

Any distance from the tip of the nozzle to the surface may be used. In some preferred applications, distances of 25-30 cm may be used.

Any type of nozzle may be used. Nozzles provided by Lechler, e.g, Nozzle No. 617 044 16, and the like, are suitable.

The compositions may also be tested with a rheometer. Any rheometer and rheometric test suitable for testing epoxy compositions may be used. A preferred rheometric test measures viscosity of the composition. One preferred test uses a Bohlin rheometer CS-50 equipped with a cone-plate (25 mm). Testing may be done at any suitable temperature, e.g., 30-60° C., preferably 40-50° C., more preferably 45° C. It is preferred to measure the viscosity while ramping up and down, and analyze the real viscosity numbers at 1 and 10 s$^{-1}$. The viscosity is preferably measured both before pre-gelling, and then after pre-gelling. The pre-gelling may be preferably done, e.g., at 120° C. The pre-gelling may preferably be done, e.g., for 5 minutes. The pre-gelling may be done in the rheometer. After the initial yield stress is measured, it is preferred to reduce shear to zero, then maintain zero shear rate during the pre-gelling process, and preferably until the temperature for the second testing (e.g., 45° C.) is attained. Any suitable shear rates can be used, e.g., from 0.1 to 20 s$^{-1}$ and back, with 2 minutes ramp-up and 2 minutes ramp-down of the shear rate.

When the above test is done, it is preferred that the viscosity increases by at least a factor of 2 at a shear rate of 1 s$^{-1}$, more preferably at least a factor of 2.5, more preferably at least a factor of 3. There is no particular upper limit on the viscosity increase at this shear rate. For convenience, it is preferred that the viscosity increased by less than a factor of 20 at a shear rate of 1 s$^{-1}$, more preferably less than a factor of 10, more preferably, less than a factor of 8.

At a shear rate of 10 s$^{-1}$, it is preferred that the viscosity increase by at least a factor of 2, more preferably at least a factor of 2.4, more preferably at least a factor of 2.8. There is no particular upper limit on the viscosity increase at this shear rate. For convenience, the it is preferred that the viscosity increased by less than a factor of 20 at a shear rate of 10 s$^{-1}$, more preferably less than a factor of 10, more preferably, less than a factor of 8.

It is even more preferred that the shear rate increase at both 1 s$^{-1}$ and 10 s$^{-1}$ as described above. For example, the viscosity preferably increases by a factor of at least 2 at both 1 s$^{-1}$ and 10 s$^{-1}$. In another preferred embodiment. the viscosity increases by a factor of at least 2.5 at 1 s$^{-1}$, and at least a factor of 2 at 10 s$^{-1}$.

EXAMPLES

Some embodiments of the invention will now be described in detail in the following Examples, wherein all parts and percentages are by weight unless otherwise specified.

Eleven compositions are prepared according to Table 1. Working Formulations A, B, D, D-1, E, E-1, G, and G-1, are in accordance with the present invention. The comparative formulations are Formulations C, F, and H. Some of the components in Table 1 are described in more detail in Table 2.

TABLE 1

| | Formulation | | | | | | | | | | |
|---|---|---|---|---|---|---|---|---|---|---|---|
| | A | B | C (comp.) | D | D-1 | E | E-1 | F (comp.) | G | G-1 | H (comp.) |
| LER like D.E.R. 330 | 48.27 | 32.5 | 48.27 | 46.41 | 43.63 | 46.41 | 43.63 | 32.5 | 30.64 | 27.86 | 47.57 |
| LER-rubbers like Struktol 3604 or 3614 or combinations | 12 | 12 | 12 | 12 | 12 | 12 | 12 | 12 | 12 | 12 | 12 |
| Toughener B | 16 | 16 | 0 | 0 | 0 | 0 | 0 | 0 | 0 | 0 | 0 |
| Toughener A | 0 | 0 | 16 | 16 | 16 | 16 | 16 | 16 | 16 | 16 | 16 |
| Polyester Dynacoll 7330/DER 330 blend (1:4) | 0 | 20 | 0 | 0 | 0 | 0 | 0 | 20 | 20 | 20 | 0 |
| Rheotix 240 | 4 | 0 | 4 | 4 | 4 | 4 | 4 | 0 | 0 | 0 | 0 |
| DICY | 4.53 | 4.3 | 4.53 | 4.39 | 4.17 | 4.39 | 4.17 | 4.3 | 4.16 | 3.94 | 4.23 |
| Accelerator A | 1 | 1 | 1 | 1 | 1 | 1 | 1 | 1 | 1 | 1 | 1 |

TABLE 1-continued

| | Formulation | | | | | | | | | | |
|---|---|---|---|---|---|---|---|---|---|---|---|
| | A | B | C (comp.) | D | D-1 | E | E-1 | F (comp.) | G | G-1 | H (comp.) |
| Accelerator ODBA | 0 | 0 | 0 | 2 | 5 | 0 | 0 | 0 | 2 | 5 | 5 |
| Accelerator OAP | 0 | 0 | 0 | 0 | 0 | 2 | 5 | 0 | 0 | 0 | 0 |
| Fumed silica | 5 | 5 | 5 | 5 | 5 | 5 | 5 | 5 | 5 | 5 | 5 |
| Filler | 8.7 | 8.7 | 8.7 | 8.7 | 8.7 | 8.7 | 8.7 | 8.7 | 8.7 | 8.7 | 8.7 |
| Colorant | 0.5 | 0.5 | 0.5 | 0.5 | 0.5 | 0.5 | 0.5 | 0.5 | 0.5 | 0.5 | 0.5 |

TABLE 2

| Raw material | Chemical description | Supplier |
|---|---|---|
| DER 330 | Liquid epoxy resin | TDCC |
| Cabosilt TS 720 | Fumed silica | Cabot |
| Accelerator A | 2,4,6-tris(dimethylamino-methyl)phenol integrated into a poly(p-vinylphenol) matrix | prepared according to U.S. Pat. No. 4,713,432 |
| Amicure CG 1200 | Dicyandiamide DICY | Air Products |
| Irgalite green | Color pigment | BASF |
| Mistrofil HS40 | Fluorite | Luzenac |
| Omya BSH | Calcium carbonate | Omya |
| Dynacoll 7330 | polyesterdiol | Evonik |
| Struktol 3604 | Rubber-epoxy adduct | Schill&Seilacher |
| Struktol 3614 | Rubber-epoxy adduct | Schill&Seilacher |

The Working and Comparative Examples use Tougheners A and B, which can be made by the following procedures.

Toughener A is a secondary-amine blocked PUR (e.g., as in US 2006/0276601, preparation of a diisopropylamine capped toughener according to formula I): 79.29 wt % dried PolyTHF 2000 (BASF), 0.54 wt % dried TMP (Merck), 13.29 wt % HDI (Bayer/Merck) are mixed at 85° C. to homogeneity. Then 0.08 wt % Snapcure 3030 (Johnson Matthey) is added and the mixture is allowed to react at 85° C. for 1 hour under nitrogen atmospheres.

To the product, 6.8 wt % diisopropylylamine (Merck) is added and the mixture is stirred for additional 60 min under nitrogen atmosphere. Degas the reaction product for 20 min under vacuum. Reaction proceeds until the NCO content is 0.0% (by FTIR).

Toughener B is a polyphenol (ODBA)-blocked PUR prepared with an excess of ODBA (e.g., as in EP 0 308 664 B1, prepolymer example 13): 64.89 wt % dried PolyTHF 2000 (BASF), 0.33 wt % dried TMP (Merck), 9.98 wt % HDI (Bayer/Merck) are mixed at 85° C. to homogeneity. Then 0.06 wt % DBTL (Sigma Aldrich) is added and the mixture is allowed to react at 85° C. for 1 hour under nitrogen atmospheres.

To the product, 24.74 wt % o,o'-diallylbisphenol A (MPI) is added and the mixture is stirred for additional 60 min under nitrogen atmosphere. Degas the reaction product for 20 min under vacuum. Reaction proceeds until the NCO content is 0.0% (by FTIR).

In these Examples, wash-off is tested by applying a bead to a metal panel (hot dipped zinc coated steel DX56D+Z100 MB), pre-gelling the bead for 15 minutes at 120° C., and applying a water jet from a Lechler Nozzle No. 617 044 16 at about 60° C., with a pressure of 1.6 bar, at an angle of 60°, from a distance of 30 cm, for 40 seconds. Wash-off performance is graded 1 (no wash-off), 2 (only slight wash-off), or 3 (severe and unacceptable wash-off).

Viscosity testing is done using a Bohlin rheometer CS-50 cone-plate (25 mm), testing at 45° C., with shear rate ramp up from 0.1 to 20 $s^{-1}$ and back. The material is tested before pre-gelling and after pre-gelling at 120° C. The gelling is done in the rheometer keeping the material at 120° C. for 5 minutes with 0 shear rate before testing at 45° C.

The results are shown in Table 3.

TABLE 3

| | Formulation | | | | | | | | | | |
|---|---|---|---|---|---|---|---|---|---|---|---|
| | A | B | C (comp.) | D | D-1 | E | E-1 | F (comp.) | G | G-1 | H (comp.) |
| Initial viscosities before gelling (Pas) | | | | | | | | | | | |
| At 1 $s^{-1}$ | 259 | 494 | 287 | 261 | 226 | 315 | 491 | 459 | 505 | 326 | 331 |
| At 10 $s^{-1}$ | 61 | 90 | 52 | 51 | 48 | 51 | 50 | 57 | 70 | 64 | 60 |
| Viscosities after gelling (Pas) | | | | | | | | | | | |
| At 1 $s^{-1}$ | 967 | 1090 | 571 | 814 | 625 | 1373 | 1766 | 1151 | 1802 | 794 | 306 |
| At 10 $s^{-1}$ | 154 | 185 | 78 | 124 | 122 | 145 | 239 | 99 | 128 | 128 | 48 |
| Factor of viscosity increase | | | | | | | | | | | |
| Increase of viscosity at 1 $s^{-1}$ | 3.7 | 2.2 | 2 | 3.1 | 2.8 | 4.4 | 3.6 | 2.5 | 3.6 | 2.4 | 0.9 |
| Increase of viscosity at 10 $s^{-1}$ | 2.5 | 2.1 | 1.5 | 2.4 | 2.5 | 2.8 | 4.8 | 1.7 | 1.8 | 2 | 0.8 |
| Delta of viscosity increase (Pas) | | | | | | | | | | | |
| Increase of viscosity at 1 $s^{-1}$ | 708 | 596 | 284 | 553 | 364 | 1058 | 1275 | 692 | 1297 | 468 | −25 |

TABLE 3-continued

| | Formulation | | | | | | | | | |
|---|---|---|---|---|---|---|---|---|---|---|
| | A | B | C (comp.) | D | D-1 | E | E-1 | F (comp.) | G | G-1 | H (comp.) |
| Increase of viscosity at 10 s$^{-1}$ | 93 | 95 | 26 | 73 | 74 | 94 | 189 | 42 | 58 | 64 | -12 |
| Wash-off performance | 1 | 2 | 3 | 2 | 1 | 2 | 1 | 3 | 2 | 1 | 3 |

Toughener B (in Formulations A and B) contains about 2 wt % free ODBA. Comparative formulation C contains no free phenol or poly-phenol in the formulation and shows no acceptable wash-off resistance, even with the presence of a gelling compound (polyamide). Formulation D contains 2 wt % of ODBA in addition to the gelling compound (polyamide). Formulation D-1 differs from D only in the amount of ODBA which is significantly higher. Formulations E and E-1 differ from D and D-1 only in the use of a mono-phenol instead of a di-phenol. Comparative Formulation F is similar to formulation C, but contains a different gelling compound (polyesterdiol). Formulations G and G-1 are similar to D and D-1 but contain a different gelling compound. Comparative Formulation H contains the poly-phenol ODBA, but no gelling compound.

Some additional physical data are shown in Table 4.

TABLE 4

| | Formulation | | | | | | | | | |
|---|---|---|---|---|---|---|---|---|---|---|
| DSC-analysis | A | B | C (comp.) | D | D-1 | E | E-1 | F (comp.) | G | G-1 | H (comp.) |
| T onset [° C.] | 163 | 161 | 164 | 165 | | 161 | | 166 | 162 | | |
| T max [° C.] | 178 | 178 | 179 | 181 | | 177 | | 181 | 179 | | |
| Delta H [J/g] | 310 | 284 | 308 | 289 | | 297 | | 279 | 275 | | |
| Tg [° C.], DSC | 108 | 101 | 113 | 103 | | 100 | | 104 | 104 | | |

Formulations A and B use two different gelling compounds. Formulation A using a polyamide and Formulation B a polyesterdiol. Both formulations use Toughener B which is made with an excess of ODBA of about 2 wt % for the entire formulation. Formulation A gels better than Formulation B, which may be related to the gelling compound. The polyamide-ODBA combination seems to be superior over the combination polesterdiol-ODBA.

Comparative Formulations C and F contain gelling compounds only, but no phenol or poly-phenol in addition. Comparative Formulation H contains no gelling compound and no phenol or poly-phenol. All Comparative Formulations show inferior gelling behavior and unacceptable wash-off results.

Formulations D, D-1, E and E-1 contain a combination of polyamide-ODBA or polyamide-OAP as gelling systems. Formulation D contains the combination polyamide-ODBA and Formulation E contains the combination polyamide-OAP. Formulations D-1 and E-1 contain more of the ODBA or the OAP. There is appears to be no significant difference in the viscosity increase between the inventive formulations, but a clear difference compared to Comparative Formulations C and H. The wash-off results appear to indicate slightly better performance with increasing amount of the phenol or the poly-phenol.

Formulations G and G-1 use polyesterdiol as gelling compound and ODBA in addition. Formulation G-1 uses more ODBA than Formulation G. All non-Comparative Formulations show significantly higher viscosity increase compared to Comparative Formulations F and H. Wash-off resistance is good and slightly better with Formulation G-1, which uses higher polyphenol content.

Surprisingly, DSC analysis shows no significant difference in the reaction kinetic, which appears to indicate that the improved gelling is not related to increased reactivity or accelerated curing.

The mechanical performance of the inventive compositions is similar to commercially available CDA formulations, such as Betamate 1620 MB or BM 1496F, e.g., impact peel strength on mild zinc coated steel of above 30 N/mm, and/or lap shear strength on the same metal of above 15 MPa.

The glass temperatures, Tg, measured by DSC analysis, have surprisingly high values of 100° C. and above, higher than commercial grades.

The invention claimed is:

1. An epoxy adhesive composition comprising an epoxy resin, a phenolic agent, a gelling agent being present in an amount of 2-6 wt % of the composition, a hardener being present in an amount of 1-10 wt % of the composition, the phenolic agent being present in an amount of 0.5-8 wt % of the composition, a toughener being present in an amount of 6-20 wt % of the composition; and a rubber component being present in a amount of 1-15 wt % of the composition; wherein
   the phenolic agent comprises at least one of o-allylphenol and o,o'-diallylbisphenol A, the gelling agent comprises at least one of a polyesterdiol, a polyamide, a fatty acid amide, and a polyvinyl butyral, the hardener comprises dicyandiamide, the toughener comprises at least one of a capped polyurethane, and a rubber modified epoxy resin, and the rubber component comprises at least one of a liquid rubber, a core-shell rubber and a polyamine-epoxy adduct.

2. A method comprising:
   applying to a surface an uncured epoxy adhesive composition comprising the adhesive composition of claim 1; and
   heating the applied epoxy adhesive for a period of 3 to 20 minutes at a temperature of 80 to 150° C. to obtain a pre-gelled epoxy adhesive.

3. The method of claim 2 wherein the pre-gelled epoxy adhesive has less than 20% wash-off when sprayed with a water jet having pressure of 2 bar, the water at a temperature of 60° C., the water jet applied for 40 seconds, at an angle of 60°, from a distance of 30 cm from the surface.

4. The method of claim 2 wherein the pre-gelled epoxy has a viscosity between 2 and 20 times the viscosity of the uncured epoxy adhesive when viscosity is measured at 45° C. at a shear rate of 1 $s^{-1}$.

5. The method of claim 2 wherein the pre-gelled epoxy has a viscosity between 2 and 20 times the viscosity of the uncured epoxy adhesive when the viscosity is measured at 45° C. at a shear rate of 10 $s^{-1}$.

6. The method of claim 5 wherein the pre-gelled epoxy has a viscosity between 2 and 20 times the viscosity of the uncured epoxy adhesive when viscosity is measured at 45° C. at a shear rate of 1 $s^{-1}$.

7. The composition of claim 1, which, when applied to a metal surface and heated for a period of 10 to 20 minutes at a temperature of 110 to 130° C., has less than 20% wash-off when sprayed with a water jet having pressure of 2 bar, the water at a temperature of 60° C., the water jet applied for 40 seconds, at an angle of 60°, from a distance of 30 cm from the surface.

8. The composition of claim 1, which, when heated for a period of 10 to 20 minutes at a temperature of 110 to 130° C., has a viscosity between 2 and 20 times the viscosity of the uncured epoxy adhesive when viscosity is measured at 45° C. at a shear rate of 1 $s^{-1}$.

9. The composition of claim 1, which, when heated for a period of 10 to 20 minutes at a temperature of 110 to 130° C., has a viscosity between 2 and 20 times the viscosity of the uncured epoxy adhesive when the viscosity is measured at 45° C. at a shear rate of 10 $s^{-1}$.

\* \* \* \* \*